(12) United States Patent
Wang et al.

(10) Patent No.: US 11,860,826 B2
(45) Date of Patent: Jan. 2, 2024

(54) CLONE-AWARE APPROACH FOR SPACE AND TIME EFFICIENT REPLICATION

(71) Applicant: Oracle International Corporation, Redwood Shores, CA (US)

(72) Inventors: Teng Wang, Nashua, NH (US); Diane Lebel, Methuen, MA (US); David Akers, Merrimack, NH (US); Frederick S. Glover, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 17/502,855

(22) Filed: Oct. 15, 2021

(65) Prior Publication Data

US 2023/0119364 A1 Apr. 20, 2023

(51) Int. Cl.
*G06F 17/00* (2019.01)
*G06F 7/00* (2006.01)
*G06F 16/178* (2019.01)
*G06F 16/185* (2019.01)

(52) U.S. Cl.
CPC .......... *G06F 16/178* (2019.01); *G06F 16/185* (2019.01)

(58) Field of Classification Search
CPC ............................ G06F 16/178; G06F 16/185
USPC ........................................................ 707/626
See application file for complete search history.

(56) References Cited

U.S. PATENT DOCUMENTS

| | | | |
|---|---|---|---|
| 7,933,872 B2 | 4/2011 | Kulkarni | |
| 8,849,767 B1* | 9/2014 | Zheng | G06F 3/0683 707/664 |
| 8,868,503 B1* | 10/2014 | Ravichandran | G06F 16/128 707/649 |
| 9,087,076 B2 | 7/2015 | Nickolov | |
| 10,303,555 B1* | 5/2019 | Lee | G06F 3/0641 |
| 10,691,637 B2 | 6/2020 | Badey | |
| 2005/0246397 A1* | 11/2005 | Edwards | G06F 16/10 707/999.204 |
| 2012/0203742 A1 | 8/2012 | Goodman | |

(Continued)

OTHER PUBLICATIONS

Woloszyn, "Trivial File Transfer Protocol (TFTP)", Politechnika Radomska, Polska, Year 2012, 10 pages.

(Continued)

*Primary Examiner* — Pavan Mamillapalli
(74) *Attorney, Agent, or Firm* — Hickman Becker Bingham Ledesma LLP; Brian N. Miller

(57) ABSTRACT

In an embodiment, a computer stores source files and source clone files in a source filesystem. The source clone files are shallow copies of the source files, which initially share the same data blocks as the source files. A source file or a source clone file may eventually be modified, where some of the shared blocks are replaced by modified blocks. In a first phase, all data blocks of all source files that are not clones are replicated to a standby filesystem. A second phase compares each clone file on the source filesystem with its base file to detect a set of differed blocks. The second phase copies the differed blocks into the standby filesystem and, in the standby filesystem, applies the differed blocks to a corresponding clone file. Efficiency of keeping the standby filesystem synchronized with the source filesystem is improved by transferring, from the source filesystem to the standby filesystem, only one copy of only data blocks that are modified.

20 Claims, 8 Drawing Sheets

(56) References Cited

U.S. PATENT DOCUMENTS

| | | | |
|---|---|---|---|
| 2013/0212070 A1 | 8/2013 | Saika | |
| 2013/0262805 A1* | 10/2013 | Zheng | G06F 3/0683 |
| | | | 711/162 |
| 2016/0292041 A1 | 10/2016 | Bender | |
| 2018/0121455 A1 | 5/2018 | Eda et al. | |

OTHER PUBLICATIONS

Thomson et al., "CalvinFS: Consistent WAN Replication and Scalable Metadata Management for Distributed File Systems", https://www.usenix.org/conference/fast15/technical-sessions/presentation/thomson, Year 2015, 15 pages.

Suel et al., "Improved File Synchronization Techniques for Maintaining Large Replicated Collections over Slow Networks", CIS Department, Polytechnic University, http://rsync.samba.org/, Year 2004, 12 pages.

Siegel et al., "The Tapis Approach to Informal File Systems and Remote Data Access", Department of Computing Science, University of Alberta, Year 2002, 11 pages.

Mashtizadeh et al., "Replication, History, and Grafting In The Ori File System", http://dx.doi.org/10.1145/2517349.2522721, Year 2013, 16 pages.

Liskov et al., "Replication In The Harp File System", Proceedings of the Thirteenth ACM Symposium on Operating Systems Principles, Year 1991, 25 pages.

Kelly, "Good Old-Fashioned Persistent Memory", Winter 2019, vol. 44, No. 4, www.usenix.org, Year 2019, 6 pages.

Irmak et al., "Improved Single-Round Protocols for Remote File Synchronization", CIS Department, Polytechnic University, Year 2005, 12 pages.

Carns et al., "Object Storage Semantics for Replicated Concurrent-Writer File Systems", Argonne National Laboratory, Year 2010, 10 pages.

Allcock et al., "Protocols and Services for Distributed Data-Intensive Science", Year 2001, 3 pages.

\* cited by examiner

CLONE-AWARE APPROACH FOR SPACE AND TIME EFFICIENT REPLICATION

FIELD OF THE DISCLOSURE

This disclosure relates to high availability for a filesystem. Presented herein are techniques that combine synchronization between multiple filesystems with hierarchical sharing of data blocks between clone files in a standby filesystem that are replicas of clone files in a source filesystem.

BACKGROUND

File replication may facilitate reliability, availability, and serviceability (RAS) of persistent data. File replication utilities such as remote synchronization (rsync), secure copy (scp), and trivial file transfer protocol (tftp) replicate files individually and are oblivious to files containing overlapping content that is shared between file clones such as sparse files in a same filesystem. Consequently, those utilities make a full replication (i.e. deep copy) of each file, which causes two technical problems. First, some of those utilities always transfer whole files even when only a tiny portion of a file is changed. Second, none of those utilities detect sharing of content, which causes two additional technical problems. First, shared content is repeatedly transferred between filesystems for each file that the same shared content occurs in. Second, in the receiving filesystem, each transferred file is treated as an independent file, which causes cessation of any sharing of content between replica files in the receiving filesystem.

Those deficiencies waste transfer time and storage space. A somewhat efficient utility that is based on data blocks instead of whole files, such as drive duplication (dd), is unaware of files and synchronization history, and thus fails to distinguish between recent changes awaiting synchronization and old changes that already were synchronized during a previous replication. This unawareness renders incremental replication more or less impossible with dd. Regardless of respective strengths of various replication utilities, no utility has heuristics needed to preserve content sharing between replica files in a receiving filesystem such as a standby filesystem.

DETAILED DESCRIPTION

Figure 1:
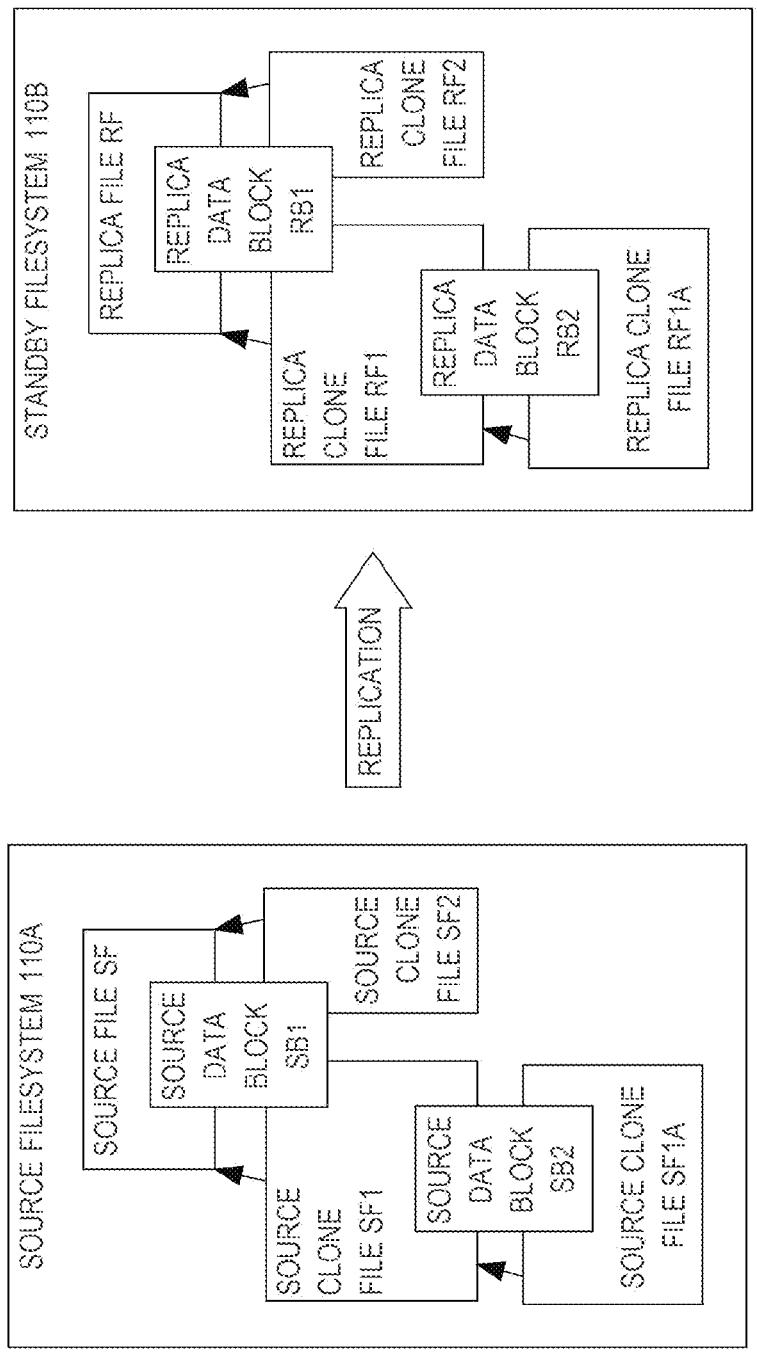
FIG. 1 is a block diagram that depicts an example storage system that provides high availability for a filesystem based on techniques that combine synchronization between a source filesystem and a standby filesystem with hierarchical sharing of replica data blocks between replica files in the standby filesystem.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Presented herein are high availability techniques that combine synchronization between multiple filesystems with hierarchical sharing of data blocks between clone files in a standby filesystem that are replicas of clone files in a source filesystem. This approach provides space and time efficient filesystem replication that complements or supplants traditional replication technologies with special treatment of file clones that share data blocks, which vastly reduces the replica size of the cloned files, and consequently provides decreased consumption of network bandwidth and storage space.

File cloning herein may include generation of thousands of clone files from a same base file and clones of clones, limited only by implementation constraints such as a filesystem's index node (inode) structure and available storage space. Techniques herein may be based on application program interfaces (APIs) of state-of-the-art filesystems. In a Linux embodiment, file input/output (I/O) clone (FICLONE) is an I/O control (ioctl) API that generates a clone file from a base file with sharing of a same underlying stored content. FICLONE is supported by a broad range of popular enterprise filesystems, such as btrfs, XFS, ZFS, OCFS2, and Oracle ACFS. Likewise, techniques herein may instead use a proprietary cloning function of some filesystems, such as fshare operations in Oracle ACFS.

Data blocks (e.g. disk blocks) of base and clone files remain shared until modified. In an embodiment, modification of a shared data block causes a copy-on-write (COW) operation that allocates new data block(s) for the modified data. Replication herein is incremental to minimize data to be synchronized. Only modified data is transferred and applied to a standby filesystem, to avoid redundant replication of data shared between base and clone files. Data blocks are units of fine-grained sharing within a filesystem and synchronization between filesystems.

This approach identifies data shared between file clones and significantly decreases the cost of synchronizing the shared data. This approach is compatible with incremental replication in which only a delta between two consecutive synchronization intervals is synchronized to a standby filesystem. The following novel features are incorporated.

Avoiding redundant replication of data shared between file clones

Replicating only changed data of a file clone

Portable to filesystems that provide a file clone operation such as a standard Linux ioctl.

For each file, this clone-aware replication classifies content into two categories: data shared with a base file, and unique data introduced by changes to a clone file or a base file after the clone being created from a base file. Data shared with other clones in a source filesystem remain shared in a standby filesystem. Clones of clones may compose chains of clones and trees of chains of clones.

A replication process is decomposed into two phases. In a first phase, all files of the source filesystem are inspected and, in the source filesystem, all clones with common ancestors (i.e. files that are roots for all their descendant subtrees of clones) are identified and aggregated. A set of clones that are directly or indirectly based on a same file, including the file itself, is referred to herein as a relative clone set (RCS). Also in the first phase, files that are not clones are synchronized to the standby filesystem.

In a second phase, all clone files in the RCSs are synchronized in a particular sequence that entails clone tree traversal by tree level. Level ordering ensures that by the time a clone is to be synchronized, the file that the clone is based on in a higher tree level has already been synchronized, which other approaches do not do.

In an embodiment, a computer stores source files and source clone files in the source file systems, these files are made up of data blocks. The source clone files are copies of the source files, which initially share the same blocks as the source files after we make the copies. After then, either the source files or the source clone files could be modified, where some of the shared blocks are replaced by the modified blocks. Once the replication starts its first stage, the replica source files that are the very first bases for other clones (i.e., they are the bases of other clones and they are not cloned from others), are first replicated to the standby file system. This replication includes a full replication of all their blocks. In the second stage, all the descendant clones of these base files are cloned on the standby, from their base files based on their clone relationship on the source file system. This clone operation ensures that the replica of shared blocks on the source file system are also shared on the standby. These clone operations are followed by the comparison of each descendant on the source file system with its base file to produce a list of differed blocks. These differed blocks are caused either by the modification on the base file or the clone file, after the clone file is cloned from the base file. As a final step of the second stage, these differed blocks are sent to the standby, and applied to the corresponding descendent.

1.0 Example Storage System

FIG. 1 is a block diagram that depicts an example storage system 100, in an embodiment. Storage system 100 provides high availability for a filesystem based on techniques that combine synchronization between source filesystem 110A and standby filesystem 110B with hierarchical sharing of replica data blocks RB1-RB2 between replica files RF, RF1-RF2, and RF1A in standby filesystem 110B. Although not shown, storage system 100 contains one or more processors that manage one or more storage devices such as network attached storage (NAS), magnetic or optical disk drives, or volatile or nonvolatile storage devices such as solid state drives (SSDs) or persistent memory (PMEM).

1.1 Example Filesystems

The one or more processors may reside in the storage devices or in one or more computers. In an embodiment, storage system 100 contains a communication network. One example embodiment consists of a computer that operates filesystems 110A-110B in respective storage devices. Another example embodiment consists of two computers that respectively operate filesystems 110A-110B in respective storage devices. In an embodiment, source filesystems 110A-110B reside in a same storage device.

In an embodiment, a storage device is just a bunch of disks (JBOD) such as a redundant array of inexpensive disks (RAID). Depending on the embodiment, data content of a storage device may be byte addressable or block addressable. Depending on the embodiment, data blocks such as SB1-SB2 and RB1-RB2 may have variable sizes or a same fixed size. In various embodiments, a data block is a disk block or a page or segment of virtual memory in primary or secondary storage in volatile or nonvolatile storage. In any case: a) each replica data block in standby filesystem 110B is a copy of a corresponding source data block in source filesystem 110A, and b) a source data block and its corresponding replica data block have a same size. As shown, replica data blocks RB1-RB2 are respective copies of source data blocks SB1-SB2.

A filesystem is a logical container of files that contain data blocks. A filesystem may be manually or automatically controlled by an application program interface (API) and/or a shell command interface that provides operations such as create, read, update, and delete (CRUD) for data block(s) or whole file(s). For example, filesystems 110A-110B may be POSIX interface compliant such as when a storage device cooperates with a POSIX device driver.

1.2 High Availability

Source filesystem 110A operates as a primary filesystem whose contents are dynamically synchronized to standby filesystem 110B, which may be passive until filesystem 110A fails, which causes failover that activates filesystem 110B as a replacement for filesystem 110A. Failover occurs when failure of filesystem 110A is detected by a foreground mechanism such as timeout or failure of a data access or by a background mechanism such as heartbeat, watchdog, or performance monitoring. In an embodiment, either or both of filesystems 110A-110B are append only such as with a write-once storage device.

Standby filesystem 110B contains replica files RF, RF1-RF2, and RF1A that are respective synchronized copies of source files SF, SF1-SF2, and SF1A that source filesystem 110A contains. For example, the contents of files SF and RF should be identical so that no data is lost by filesystem failover. Synchronization strategies and mechanisms are discussed later herein. In an embodiment after failover, roles of filesystems 110A-110B are reversed so that source filesystem 110A may, by synchronization in the opposite direction, become a standby for now-primary filesystem 110B. In an embodiment after such recovery of filesystem 110B, storage system 100 may revert to the original cooperation with source filesystem 110B again as primary.

1.3 Data Block Configuration

Data blocks may be arranged in one or both of two orthogonal ways that are referred to herein as sharing and synchronizing. Sharing occurs when a same data block is effectively contained in multiple files of a same filesystem. For example as shown, source files SF and SF1 may contain respective index nodes (inodes) (not shown) that reference same source data block SB1 For example, both inodes may contain a same logical block address (LBA) that identifies source data block SB1. Source data block SB1 may be simultaneously accessed in both of source files SF and SF1 as if there were two respective data blocks even though source data block SB1 is physically only one data block.

Sharing data blocks saves storage space by avoiding duplicate data. In an embodiment with virtual memory and/or memory-mapped input/output (I/O), sharing accelerates data access by decreasing storage device I/O and/or decreasing thrashing of virtual memory or hardware caches (e.g. L1-L3). Although not shown, a file may contain data blocks that are not shared with other files.

Synchronization provides ongoing mirroring between multiple filesystems. For example, source data block SB1 in source filesystem 110A is synchronized with corresponding replica data block RB1, which entails initial copying of the content of source data block SB1 to replica data block RB1 and repeated copying if content of source data block SB1 is subsequently modified. In various embodiments, copying involves complete or partial replacement of content of replica data block RB1.

1.4 File Configuration

Files may be arranged in one or both of two orthogonal ways that are known herein as cloning and synchronizing. In various scenarios discussed later herein, synchronizing source file SF with its corresponding replica file RF entails synchronizing some data blocks in source file SF with corresponding data blocks in replica file RF as discussed above. Thus: a) any data block synchronization should occur during synchronization of files, and b) high availability of files is based on high availability of filesystems and data blocks as discussed above.

File cloning entails shallow copying based on sharing data blocks. For example as shown, source data block SB1 is shared by source files SF and SF1 because source clone file SF1 is a clone of source file SF. Initial cloning entails: a) generating source clone file SF1 such that b) source clone file SF1 consists of data blocks shared by source file SF, and c) all of source file SF's data blocks are shared with source clone file SF1. Initially, no new data blocks are allocated for source clone file SF1 that may be a sparse file that is thinly provisioned.

File cloning is mirrored between filesystems 110A-110B such that source clone file SF1, which is a shallow copy of source file SF, corresponds to replica clone file RF1 that is a shallow copy of replica file RF. Because replica file RF mirrors source file SF that contains source data block SB1 that is shared with source clone file SF1 as shown, corresponding data block sharing occurs in standby filesystem 110B. That is, source data block SB1 corresponds to replica data block RB1 that is shared by replica files RF and RF1 as shown. Replica files sharing data blocks provides efficiencies, including: a) disk space is saved in standby filesystem 110B in the same way as discussed above for source filesystem 110A, and b) I/O of storage devices and/or a communication network is decreased as follows.

1.5 Synchronization

Modification of source file SF may entail modification of source data block SB1. Although the modification may be expressly applied only to source file SF, the modification of shared source data block SB1 may be treated as modifications to both of source files SF and SF1. Thus, other approaches may wrongly decide that synchronization of both source files SF and SF1 is needed, which may cause source data block SB1 to be unnecessarily synchronized twice which, even worse, may cause replica files RF and RF1 to stop sharing replica data block RB1 and instead unnecessarily materialize separate respective data blocks in standby filesystem 110B. In other words, synchronization of shared source data blocks by other approaches may destroy sharing of replica data blocks.

Instead, storage system 100 perfectly maintains filesystem mirroring during synchronization, including preserving continued sharing of replica data blocks in standby filesystem 110B. In an embodiment during filesystem synchronization, storage system 100: a) detects that synchronizing source file SF causes synchronization of source data block SB1, and b) reacts by not repeating synchronization of source data block SB1 when synchronizing source clone file SF1. Such avoidance of redundant synchronization of a shared source data block decreases I/O of storage devices and/or a communication network and preserves sharing of replica data blocks. In that way, filesystems 110A-110B will remain identical.

1.6 File Clones

Multiple clones may be made from a same file. For example as shown, source clone files SF1-SF2 are both clones of source file SF. As shown, source data block SB1 is shared by all of source files SF and SF1-SF2. In an embodiment, there is no logical limit to how many files may share a same data block nor how many clones a base file such as source file SF may have, although a filesystem may impose a practical limit on an amount of sharing and/or cloning. When all of source clone files SF1-SF2 and source file SF are identical, those three source files each consists of a same set of shared data blocks. Divergence of any of those three files by separate modification is discussed later herein.

A clone file may itself be cloned. For example as shown, source clone file SF1A is a shallow copy of source clone file SF1 that is a shallow copy of source file SF. Thus, cloning may establish a linear chain of clone files that are directly or indirectly based on a base file. In an embodiment, there is no logical limit to how long a chain of clones may be, although a filesystem may impose a practical limit on chain length. Although not shown, when all files in a chain are identical, those files consist of a same set of shared data blocks.

In a chain of files that begins at source file SF and ends at source clone file SF1A, each of the chained files may individually be a base file, a clone file, or both. The root of the chain is only a base file, such as source file SF. The end of the chain is only a clone file, such as source clone file SF1A. Any other files in the chain are simultaneously both a base file and a clone file. For example, source clone file SF1 is a clone of source file SF and a base for source clone file SF1A. A base file may be a direct base and/or an indirect base. For example, source file SF is a direct base of source clone file SF1 and an indirect base of source clone file SF1A.

As shown and by separate modifications as discussed later herein, two or three of chained source files SF, SF1, and SF1A have diverged, which means that, by separate modification, their contents have diverged such that SF, SF1, and SF1A are no longer identical. For example as shown in the chain, source data block SB1 is not shared with source clone file SF1A, and source data block SB2 is not shared with source file SF. Likewise and although not shown, source data block SB1 may cease to be shared with, for example, source file SF or source clone file SF1.

2.0 Non-Identical Clones

Figure 2:
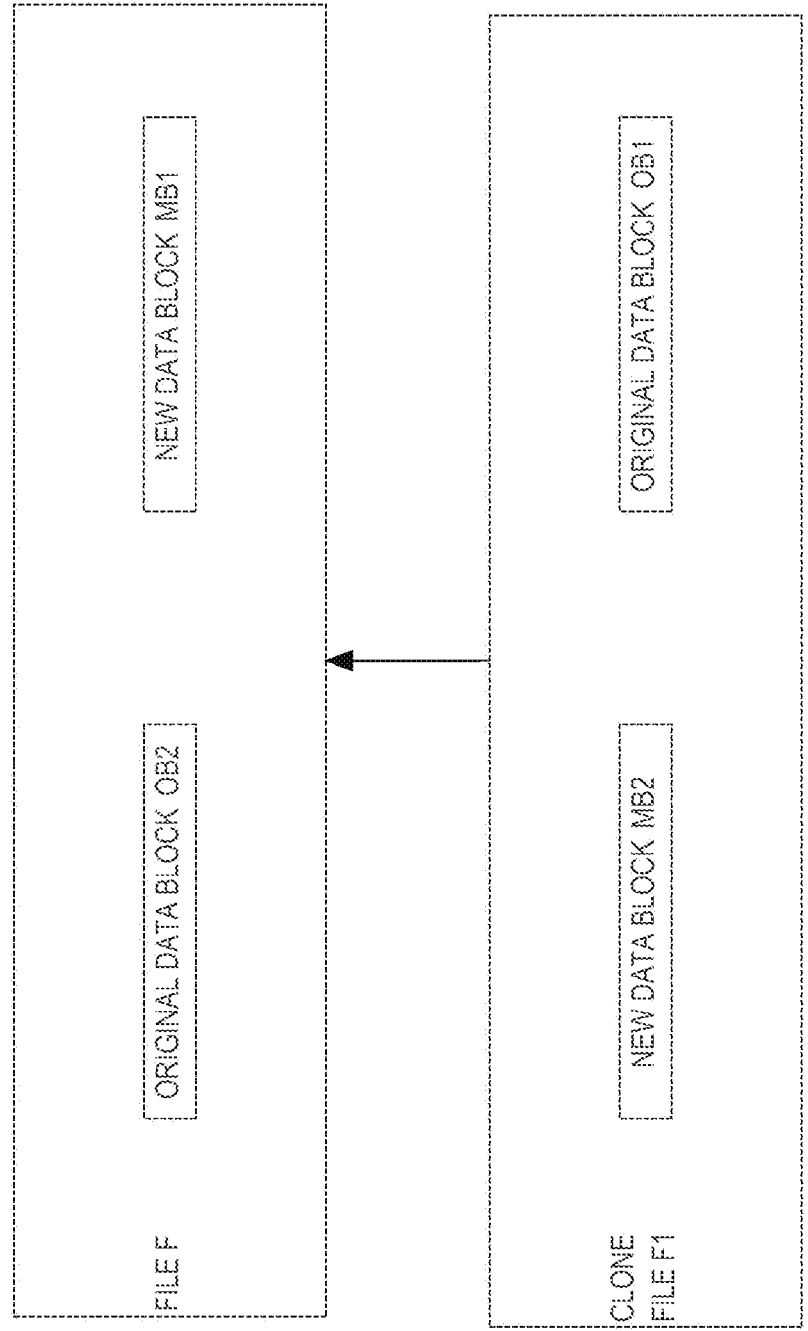
FIG. 2 is a block diagram that depicts an example filesystem that is a legend that depicts a generalization of source and standby filesystems.

FIGS. 1-2 are discussed together as follows. FIG. 2 is a block diagram that depicts an example filesystem 200, in an embodiment of storage system 100 of FIG. 1.

To demonstrate divergence, filesystem 200 is a legend that depicts a generalization of filesystems 110A-110B. Storage system 100 does not actually contain filesystem 200 as a third filesystem, which is why filesystem 200 is shown drawn with dashed lines. In other words, filesystem 200 may be either of filesystems 110A-B. Features shown in filesystem 200 occur in source filesystem 110A and then, by synchronization, also occur in standby filesystem 110B. For example as shown, filesystem 200 contains a partial chain of files F and F1 that may actually be: a) source files SF and SF1, b) source files SF1 and SF1A, c) replica files RF and RF1, or d) replica files RF1 and RF1A.

2.1 Copy on Write

As explained earlier herein, each of files F and F1 in the chain in filesystem 200 initially were identical and consisted of a same set of shared data blocks OB1-2, although shown as having since diverged. A shared data block may or may not have copy-on-write semantics. Without copy-on-write, in FIG. 1, either of source clone files SF1 and SF1A may be used to modify shared source data block SB2, and the modification is effective in both source clone files SF1 and SF1A because sharing of source data block SB2 continues after the modification.

With copy-on-write, modification of a data block may instead cause sharing of the data block to cease. When one of source clone files SF1 and SF1A is used to modify source data block SB2, a new data block is allocated to store the modified content of source data block SB2. In other words, copy-on-write causes two versions of source data block SB2 that are respectively stored in source clone files SF1 and SF1A.

For example although not shown in FIG. 2, files F and F1 initially shared original data blocks OB1-2. If file F is used to modify original data block OB1, then file F subsequently contains the modified version in newly allocated new data block MB1 as shown. Likewise, file F1 continues to contain unmodified original data block OB1 as shown.

In that example, file F operates as a base file that is modified and responsively contains a newly allocated data block, e.g., MB1. In another example, clone file F1 instead is modified and responsively contains newly allocated data block MB2, instead of the base file. Likewise, file F continues to contain unmodified original data block OB2 as shown.

2.3 Tree of Clones

As shown in FIG. 1, source file SF is a base file that is a root file of a logical tree that also includes source clone files SF1-SF2 and SF1A. This logical tree of clone files is not the same as a directory tree in a filesystem. For example, source files SF, SF1-SF2, and SF1A may be in a same or different directories. A filesystem may contain many such logical trees that each contains a different root file and a different set of clones. These logical trees are disjoint such that they do not overlap, intersect, nor have any file in common. As discussed later herein, each disjoint tree may contain a separately discoverable set of files and may be separately synchronized.

In any case, the scope of copy-on-write may depend on where in a tree is an involved data block. When a modified version of a data block arises in one branch of the tree, other branches will continue to contain an unmodified version. For example if source clone file SF2 is used to modify source data block SB1, then source clone files SF1 and SF1A will not contain the modified version. Likewise, a modification will not propagate up a chain toward the root. For example, if source clone file SF1A is used to modify a data block that is shared with an entire chain, then neither source file SF nor SF1 will contain the modified version. Likewise, a modification will not propagate down a chain toward the leaves. For example, if instead source clone file SF1 is used to modify the data block that is shared with the entire chain, then SF1A will not share the modified version. In an embodiment, source clone files SF1-SF2 may continue to share an unmodified version of source data block SB1 after source file SF is used to modify source data block SB1.

3.0 Synchronization Process

Figure 3:
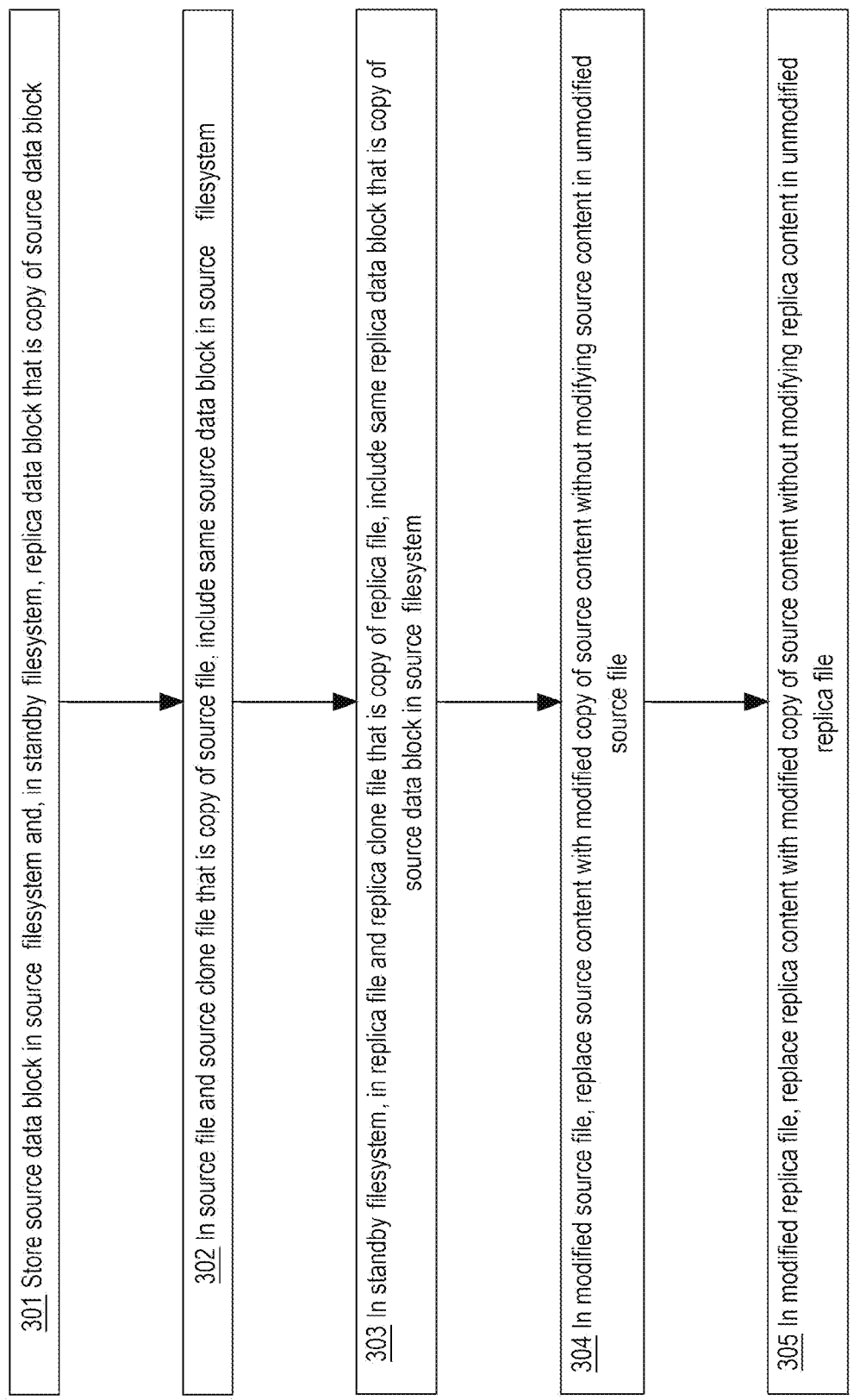
FIG. 3 is a flow diagram that depicts an example computer process that provides high availability for a filesystem based on techniques that combine synchronization between a source filesystem and a standby filesystem with hierarchical sharing of replica data blocks between replica files in the standby filesystem.

FIG. 3 is a flow diagram that depicts an example computer process to provide high availability for a filesystem based on techniques that combine synchronization between source filesystem 110A and standby filesystem 110B with hierarchical sharing of replica data blocks RB1-RB2 between replica files RF, RF1-RF2, and RF1A in standby filesystem 110B, in an embodiment. FIG. 3 is discussed with reference to FIGS. 1-2.

Step 301 stores source data blocks SB1-SB2 in source filesystem 110A and, in standby filesystem 110B, stores replica data blocks RB1-RB2 that are copies of respective source data blocks SB1-SB2.

In source file SF and source clone file SF1 that is a copy of source file SF, step 302 includes same source data block SB1 in source filesystem 110A. Additionally or instead, in source clone file SF1 and source clone file SF1A that is a copy of source clone file SF1, step 302 may include same source data block SB2 in source filesystem 110A.

In standby filesystem 110B, step 303 replicates what step 302 did in source filesystem 110A. In standby filesystem 110B, in replica file RF and replica clone file RF1 that is a copy of replica file RF, step 303 includes same replica data block RB1 that is a copy of source data block SB1 in source filesystem 110A. Additionally or instead, in standby filesystem 110B, in replica clone file RF1 and replica clone file RF1A that is a copy of replica clone file RF1, step 303 may include same replica data block RB2 that is a copy of source data block SB2 in source filesystem 110A.

Step 304 modifies a modified source file that may be either source file SF or source clone file SF1. In various embodiments, modification by step 304 entails replacement of source content that variously is source data block SB1 itself or only the contents of source data block SB1 as explained earlier herein. In the modified source file, step 304 replaces that source content with a modified copy of the source content without modifying the source content in an unmodified source file that is the other of source file SF or source clone file SF1. Additionally or instead, step 304 is performed for source data block SB2 and source clone files SF1 and SF1A.

In standby filesystem 110B, step 305 replicates what step 304 did in source filesystem 110A. Specifically, step 305 modifies a modified replica file that may be either replica file RF or replica clone file RF1. In various embodiments, modification by step 305 entails replacement of replica content that variously is replica data block RB1 itself or only the contents of replica data block RB1. In the modified replica file, step 305 replaces that replica content with a modified copy of the source content without modifying the replica content in an unmodified replica file that is the other of replica file RF or replica clone file RF1, the modification is received from the source file system 110A and applied on file system 110B. Additionally or instead, step 305 is performed for replica data block RB2 and replica clone files RF1 and RF1A.

4.0 Synchronization of Tree of Clones

As explained earlier herein for FIG. 1, in source filesystem 110A, source file SF operates as: a) a base file at the start of two chains of clone files that respectively end at source clone files SF1A and SF2 as shown, and b) a root file for a tree of clone files that contains both chains as branches. Likewise as shown, standby filesystem 110B contains a tree of clone files that is a replica of the tree of clone files in source filesystem 110A. Either of those two trees of clone files may be referred to herein as a replica clone set (RCS).

Figure 4:
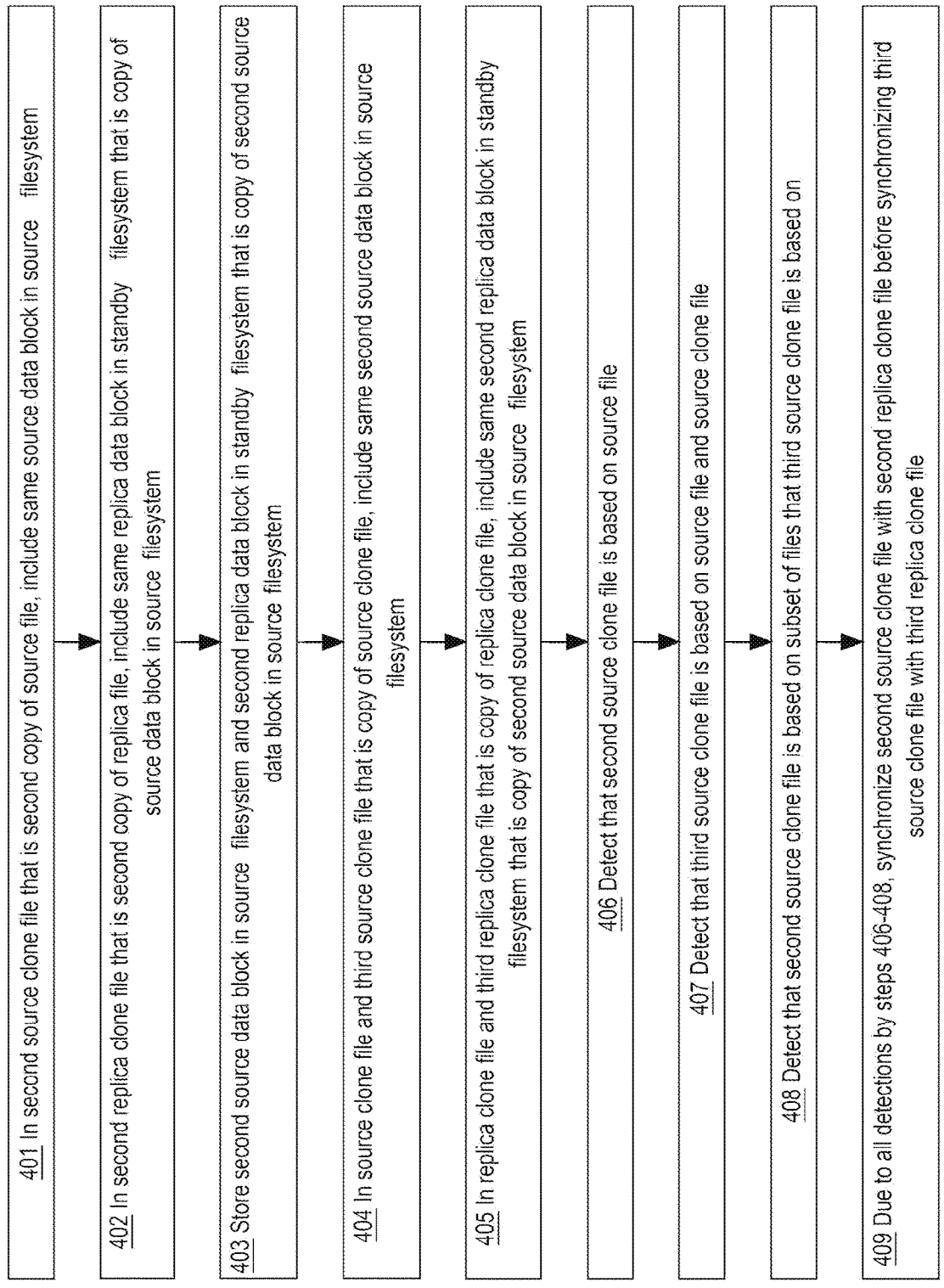
FIG. 4 is a flow diagram that depicts an example computer process that synchronizes a tree of clone files in a source filesystem with a tree of replica clone files in a standby filesystem.

FIG. 4 is a flow diagram that depicts an example computer process to synchronize the tree of clone files in source filesystem 110A with the tree of replica clone files in standby filesystem 110B, in an embodiment. FIG. 4 is discussed with reference to FIGS. 1-2.

The process of FIG. 4 occurs in two sequential phases that may be temporally separated. The first phase generates the two similar trees of clone files in their respective filesystems 110A-B. Between the first phase and second phase and although not shown, the source tree in source filesystem 110A may accumulate modified data blocks at different levels of the source tree and in both branches of the source tree. In other words, before the second phase, the two trees differ because the source tree contains modified data blocks and the replica tree does not. Thus, synchronization is needed, which the second phase performs as follows.

In the second phase, the modified data blocks in source filesystem 110A are synchronized with (i.e. replicated to) standby filesystem 110B, eventually such as by periodic schedule or upon some condition such as a threshold count of: modified data blocks, modified files, or multiblock transaction commits. This approach synchronizes files while traversing the source tree in a particular ordering to preserve data block sharing throughout the replica tree. Other approaches do not use the particular ordering, which may wrongly cease data block sharing in the replica tree.

Periodic or otherwise, repeated synchronization of a same source tree may be needed because contents in the source tree may be modified at different times. For example, a same source data block may sequentially be: a) modified before synchronization, b) modified again after synchronization, thereby necessitating another synchronization. When and how frequent is the synchronization may be configurable.

As explained above, one of the branches of the source tree is a source chain that ends at source clone file SF1A (e.g., SF=>SF1=>SF1A). Mirroring the source chain in source filesystem 110A is a replica chain that ends at replica clone file RF1A in replica filesystem 110B (e.g., RF=>RF1=>RF1A). Although not shown, the first phase of FIG. 4 includes: a) generating the source chain in source filesystem 110A and b) mirroring the source chain by generating the replica chain in standby filesystem 110B. Part of doing (a)-(b) entails steps 301-303 of FIG. 3. As further discussed below, the process of FIG. 4 includes the process of FIG. 3.

The first phase includes steps 401-405 that generate two similar trees of clone files in respective filesystems 110A-B as follows. As shown, source clone files SF1-2 are both directly based on source file SF. In source clone file SF2, step 401 includes source data block SB1 in source filesystem 110A. Thus, the source tree has two branches, and all three of source files SF and SF1-2 share source data block SB1 as shown.

As shown, replica clone files RF1-2 are both directly based on replica file RF. In replica clone file RF2, step 402 includes replica data block RB1 in standby filesystem 110B that is a copy of source data block SB1 in source filesystem 110A. Thus: the replica tree mirrors the source tree; the replica tree has two branches; and all three of replica files RF and RF1-2 share replica data block RB1 as shown. In other words, a same data block may be shared in different branches, which may cause other synchronization approaches to malfunction such as wrongly cease sharing of replica data block RB1 between multiple branches in the replica tree.

Steps 403-405 operate solely on one respective branch of the source tree and replica tree that respectively are the source chain and the replica chain as follows. Step 403 stores source data block SB2 and its corresponding replica data block RB2. As shown, source clone file SF1 contains both source data blocks SB1-2 although neither of source data blocks SB1-2 is shared across the entire source chain. Step 403 stores: a) source data block SB2 in source filesystem 110A and b) replica data block RB2 in standby filesystem 110B that is a copy of source data block SB2 in source filesystem 110A.

Steps 404-405 respectively perform inclusion of source data block SB2 and its corresponding replica data block RB2. In source clone files SF1 and its clone, source clone file SF1A, step 404 includes same source data block SB2 in source filesystem 110A. As shown, source file SF does not include source data block SB2, which means that source files SF and SF1 previously diverged and, as explained earlier herein, the source chain remains intact despite such divergence.

In replica clone files RF1 and its clone, replica clone file RF1A, step 405 includes same replica data block RB2 in standby filesystem 110B that is a copy of source data block SB2 in source filesystem 110A. As shown, replica file RF does not include replica data block RB2, and the replica chain remains intact despite such divergence within the replica chain to mirror divergence within the source chain as discussed above.

After the first phase, the source tree in source filesystem 110A accumulates modified data blocks at different levels of the source tree and in both branches of the source tree. Eventually as discussed above, the second phase synchronizes the modified data blocks in source filesystem 110A into standby filesystem 110B according to steps 406-409 as follows.

As discussed above, synchronization of modified files should occur in a particular ordering that, in an embodiment, is based on multiple conditions that are detected by steps 406-408 as follows. Those detections may be based on inspection and analysis of metadata stored in or available to storage system 100 that describes the topology of the source tree in source filesystem 110A, including: a) which clone file is directly based on which other file and b) which data blocks are included in which file(s). Based on that metadata, storage system 100 can infer: a) which files are in which chain, b) which chains are branches in the source tree, and c) which files share which data block.

For example, the metadata may include: a) file identifiers such as paths and/or index node (inode) identifiers and/or b) data block identifiers such as logical block addresses (LBAs). Same or different metadata may indicate replication details such as: a) which filesystem is a standby and b) which replica file mirrors which source file.

Step 406 detects that source clone file SF2 is based on source file SF. Step 407 detects that source clone file SF1A is based on both of source files SF and SF1. With steps 406-407, storage system 100 has begun analysis of metadata for the whole source tree.

Also with steps 406-407, storage system 100 has detected that both of source clone files SF2 and SF1A are in a same source tree because both of source clone files SF2 and SF1A are directly or indirectly based on same source file SF even though source clone files SF2 and SF1A do not occur at a same level in the source tree. Step 408 detects that source clone file SF1A, but not source clone file SF2, is based on source clone file SF1. In other words, step 408 detects that source clone file SF2 is based on a subset of files that source clone file SF1A is based on. Thus, step 408 detects that source clone files SF2 and SF1A are in different levels of the source tree.

Data blocks not shared by multiple files may be synchronized in any ordering. Data blocks shared by files in different levels of the source tree should be synchronized in a relative ordering based on increasing tree level. In other words, in the same source tree or, depending on the embodiment, in the same branch of that tree, shared data blocks in a file that is based on fewer files should be synchronized before shared data blocks in a file that is based on more files. Thus, shared source data block SB1 in source file SF should be synchronized before synchronizing shared source data block SB2 in source clone file SF1 because source clone file SF1 is based on one file and source file SF is based on zero files.

In a single threaded embodiment, the shared and unshared modified data blocks of the files of the source tree are synchronized in breadth first order or depth first order of the files in the source tree. In an embodiment where an asynchronous queue decouples two pipeline stages for pipeline parallelism: a) the shared and unshared modified data blocks of the files of the source tree are enqueued in breadth first order or depth first order of the files in the source tree by the first stage, and simultaneously b) the second stage synchronizes the modified data blocks from the queue to standby filesystem 110B.

The second stage may synchronize data blocks individually, in a batch per file, or in a batch of a fixed count of data blocks. The queue may maintain metadata such as which source file did which modified data block come from and/or which other source files further down the source tree share that same data block. If filesystems 110A-B are managed by respective computers, synchronization may entail sending metadata with a data block or a batch to facilitate mirroring when the modified data block or batch is applied in standby filesystem 110B.

In an embodiment, all unshared data blocks are synchronized before any shared data block or vice versa. In an embodiment, source filesystem 110A contains multiple source trees that are disjoint as discussed earlier herein, and the multiple source trees are concurrently synchronized such as with a separate thread or a separate pipeline per source tree. In an embodiment, multiple branches of a same source tree are concurrently synchronized such as with a separate thread or a separate pipeline per tree branch.

Although not shown, additional branching may occur at different levels in the source tree such that the source tree contains multiple subtrees. In an embodiment, multiple subtrees of a same source tree are concurrently synchronized such as with a separate thread or a separate pipeline per subtree. In any of those various embodiments, shared source data block SB1 should be synchronized before shared source data block SB2 according to the heuristics and reasons discussed above. Disjoint trees, tree levels, subtrees, metadata for tree analysis, and inodes are further discussed later herein for FIG. 5.

In some cases, ordering by tree level may be relaxed, such as with depth first traversal, such that level ordering of synchronization is imposed only within a same chain (i.e. tree branch). For example, step 409 as discussed above need not be a strict requirement because step 409 imposes a synchronization ordering that encompasses different tree branches (i.e. chains).

In all embodiments, for a given synchronization of a given source tree, each modified data block is synchronized exactly once. For example even though a same tree traversal visits source files SF and SF1 at separate respective times, and even though same source data block SB1 is shared by both source files SF and SF1, shared source data block SB1 is only expressly synchronized for source file SF but not again for source clone file SF1.

Likewise in all embodiments, unmodified source data blocks, whether shared or not, are not synchronized after initial replication. Thus, techniques herein guarantee: a) preservation of replica data block sharing and b) synchronization of a minimized count of data blocks. Such minimal synchronization per (b) decreases network input/output (I/O), which accelerates synchronization. Thus as a synchronization computer, storage system 100 itself is accelerated. Likewise, by preventing wrongly ceasing sharing of replica data blocks per (a), the reliability of storage system 100 itself is increased.

5.0 Discovery of Trees of Clones

Figure 5:
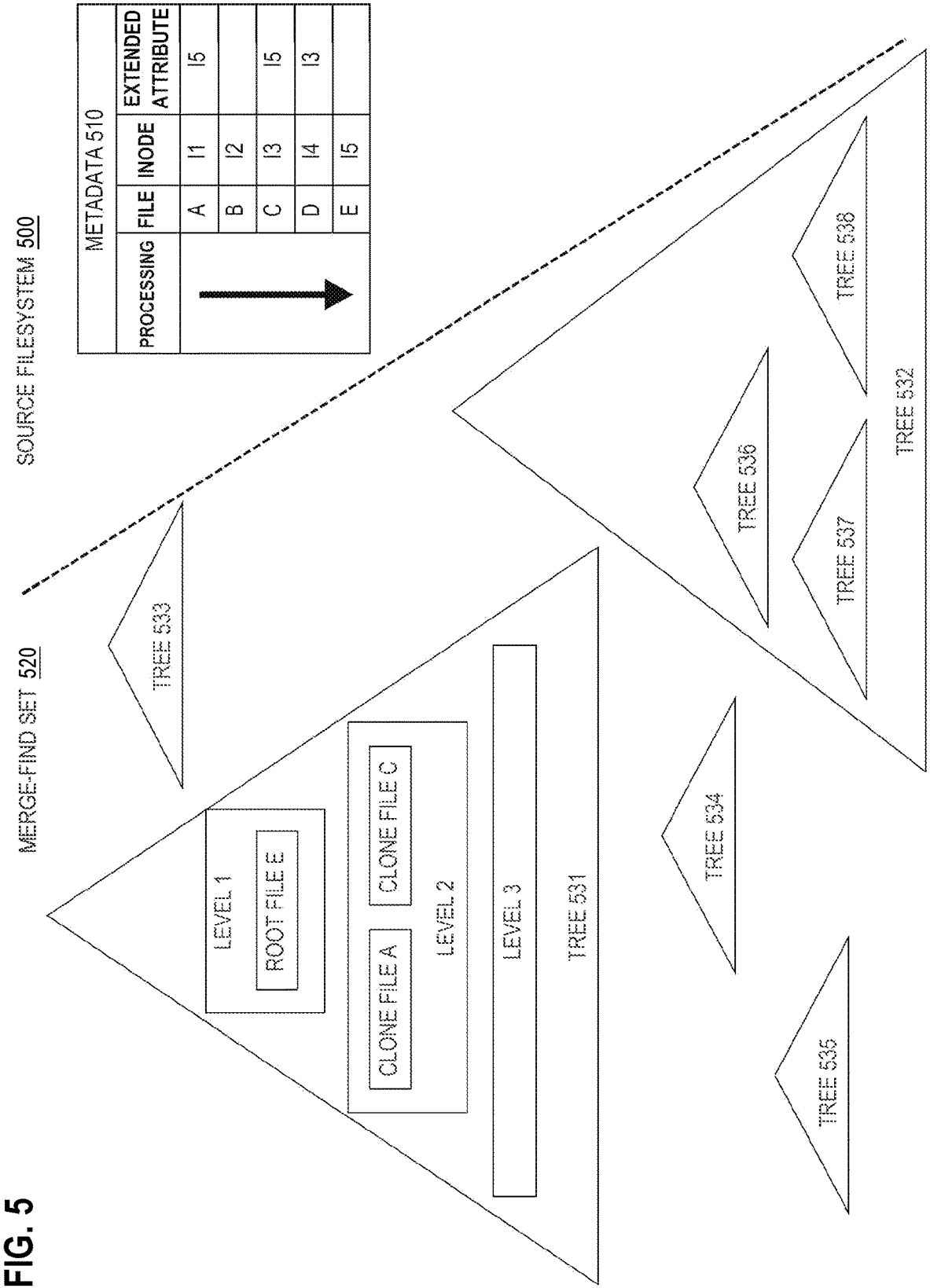
FIG. 5 is a block diagram that depicts an example source filesystem that is represented by incrementally growing a merge-find set based on persistent metadata.

FIG. 5 is a block diagram that depicts an example source filesystem 500 that is represented by incrementally growing merge-find set 520 based on metadata 510 that is persistent, in an embodiment.

As explained earlier herein, a tree of clone files may be orthogonal to a directory tree of files. For example, a directory may contain files from different clone trees. Likewise, a clone tree may contain files from different directories in source filesystem 500. A consequence of this orthogonality is that a natural and orderly traversal of a tree of directories may visit files in a seemingly arbitrary ordering that does not reflect the existence and organization of multiple source trees.

For example, trees 531-535 may each be a source tree or a subtree of a source tree. Tree 531 contains levels 1-3 that contain files as shown. Even though clone files A and C are in a lower clone tree level than is root file E, either or both of clone files A and C may occur in a higher directory tree level than root file E. In that case, clone file A or C would be visited before visiting root file E during a breadth first traversal of a tree of directories in source filesystem 500.

Likewise, even if clone file A or C occurs in a lower level of a tree of directories than root file E, clone file A or C could be visited before visiting root file E during a depth first traversal of a tree of directories in source filesystem 500, so long as clone file A or C occurs in a different branch of the tree of directories than does root file E. Those examples of arbitrary visitation ordering may complicate discovery of the existence and configuration of clone trees.

To solve that technical problem, merge-find set 520 may be grown and used as a representation of source filesystem 500 based on metadata 510. Merge-find set 520 may be a data structure in memory of a computer and incrementally grown as follows.

5.1 Example Persistent Metadata

Metadata 510 is persisted in source filesystem 500. Although metadata 510 is demonstratively shown as tabular, each row of metadata 510 may instead be stored within source filesystem 500 in separate respective one or more inodes as follows. In an embodiment, each row of metadata 510 is stored in a same or different respective inode of a same or different respective directory.

In metadata 510, shown columns file, inode, and extended attribute are stored in a directory inode for one or more of files A-E that reside in that directory. The file column identifies each file such as by name. The inode column identifies (e.g. by inode number or by LBA) a first inode of each file that effectively locates and/or identifies the file within source filesystem 500. The extended attribute column stores attributes that are ignored by source filesystem 500 but that have semantics to replication logic of the storage system. In this approach, the extended attribute column identifies the first inode of a direct base file for a clone file.

For example as shown in the first row of metadata 510, file A starts at inode I1 and is based on a file that starts at inode IS. Thus, file A is a clone file. Likewise as shown in the second row of metadata 510, file B starts at inode 12 but has no base file. Thus, file B is a root of a source tree.

5.2 Example Volatile Merge-Find Set

As explained earlier herein, a computer may discover files A-E by traversing a tree of directories in source filesystem 500 that may be orthogonal to the source trees of clones in source filesystem 500. For example as demonstratively shown by the processing column of metadata 510, the computer discovers one file at a time by sequentially processing one metadata row at a time in a downwards ordering of rows as shown by the arrow. In other words, the computer discovers file A first and file E last, which may be a technical problem because the computer would not discover the root file of tree 531 until last. Another technical problem is that clone files A and C are discovered before discovering their base file. Yet another technical problem is that file B is discovered between files A and C even though file B belongs in a different source tree than files A and C.

All of those technical problems of discovery ordering are solved with merge-find set 520 as follows. Initially, merge-find set 520 is empty and discovery of files A-E begins at the top row of metadata 510 that is file A. For example, in the directory inode of an initial directory, such as a root directory of source filesystem 500 or a current working directory (CWD) of a storage system driver, are directory entries such as for subdirectories and/or at least file A of files A-E. Thus, file A is discovered first.

In merge-find set 520, a potential source tree is generated that is only a potential source tree that is later discovered to actually be a subtree in yet undiscovered tree 531. The directory entry that declares file A specifies, as shown, that file A begins in other inode I1 and is based, as shown according to the extended attribute of the directory entry, on whichever file begins at inode 15. However, the base file at inode 15 has not yet been discovered. Thus in merge-find set 520, file A cannot yet join the source tree that would contain the base file at inode because that source tree has not yet been generated in merge-find set 520. Thus temporarily, file A by itself has its own tree in merge-find set 520.

5.3 Source Tree Discovery Example

Processing of metadata 510 proceeds to the next directory entry or the first directory entry of the next subdirectory. In other words, the next row of metadata 510 is processed, which is file B that has an empty extended attribute. Thus, file B has no base file, which means file B is the root of a source tree that is generated as any of trees 532-535. At this point, files A-B are alone in separate respective trees in merge-find set 520.

Next in metadata 510 is file C that is processed in the same way as file A. In other words, both of files A and C are alone in their own respective trees. At this point, files A-C are alone in separate respective trees in merge-find set 520.

Next in metadata 510, file D is discovered that specifies inode 13 that is the inode of file C that merge-find set 520 already contains. Thus, file D is not processed in the same way as files A-C. Instead, file D is added to merge-find set 520 as a clone that is based on file C. In other words, files C-D are in the same potential source tree.

Next in metadata 510, file E is discovered whose extended attribute is empty. Thus similar to file B, file E is a root of a source tree. However unlike file B for which no clones were discovered, because file E starts at inode IS, file E is the direct base file of files A and C that are alone in their own respective trees in merge-find set 520. Thus as shown: a) source tree 531 is generated that has file E as its root, and b) the potential trees of files A and C become subtrees in tree 531.

Assuming metadata 510 has more rows for more files than shown: a) trees 532-538 are eventually added to merge-find set 520, and those trees may independently grow, and b) some of those trees may become subtrees in each other or in tree 531. Thus, merge-find set 520 grows by: a) generating small new trees, b) independently growing trees larger by incrementally adding files to the trees, and c) merging some trees as subtrees into other trees.

When all of metadata 510 has been processed, populating of merge-find set 520 ceases. Merge-find set 520 fully specifies all source clone trees in source filesystem 500, including: a) which file is a root of which source tree, and b) which clone files are directly based on which files.

As discussed earlier herein, replication may occur by descending by level into each source tree. For example as shown, tree 531 has three levels 1-3. A first level contains only a root file of the source tree. As shown in metadata 510, file D is based on file C that is in level 2 of tree 531. Thus although not shown, file D is in level 3 of tree 531.

6.0 Lifecycle of Multiple Trees of Clones

Figure 6:
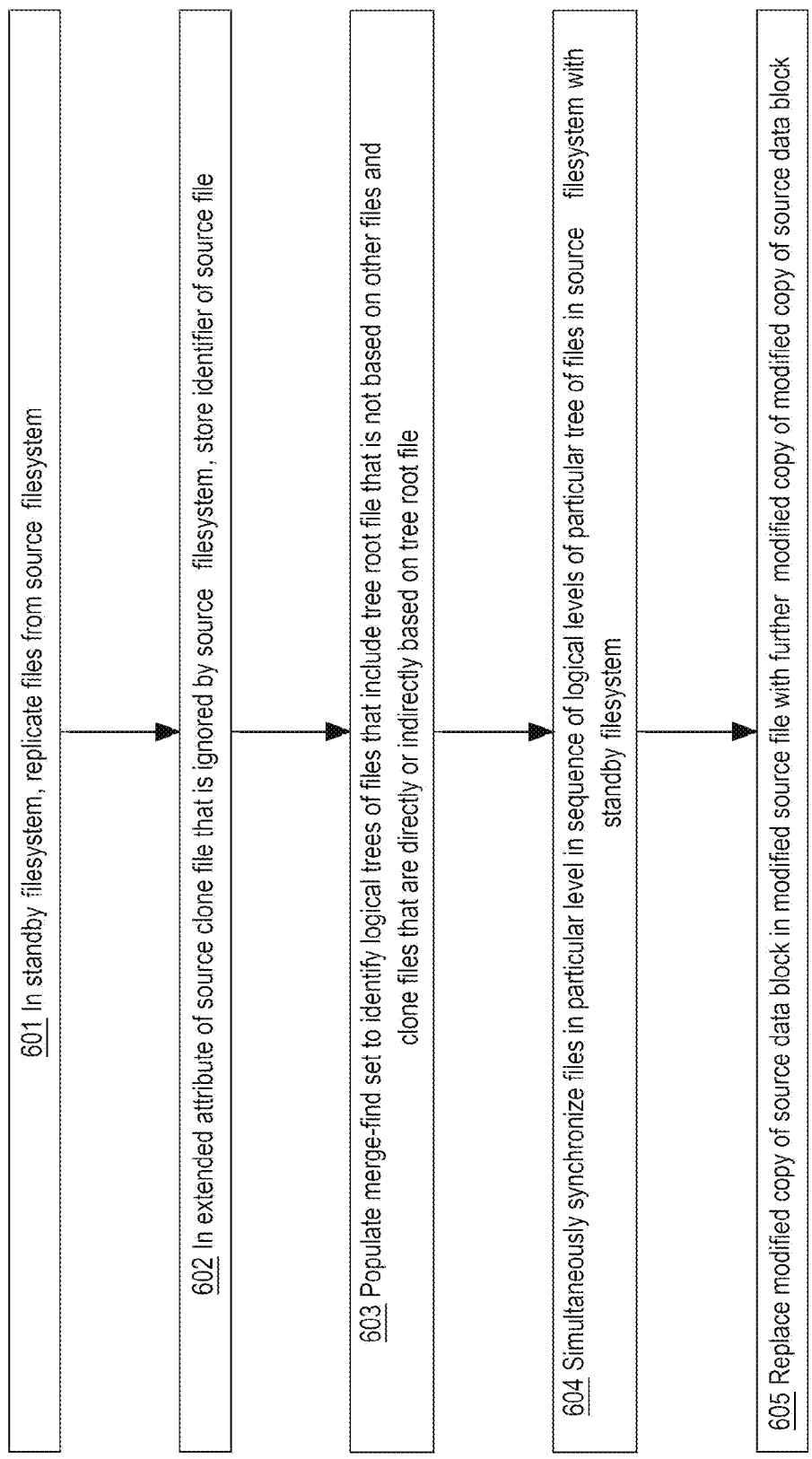
FIG. 6 is a flow diagram that depicts an example computer process that discovers and synchronizes multiple trees of clone files in a source filesystem.

FIG. 6 is a flow diagram that depicts an example computer process to discover and synchronize multiple trees of clone files in source filesystem 500, in an embodiment. FIG. 6 is discussed with reference to FIG. 5.

An initialization phase is performed only once and includes step 601 that replicates files A-E from source filesystem 500 to a standby filesystem. Thus, the standby filesystem mirrors source filesystem 500.

After the initialization phase, a synchronization phase may be repeated at various times to synchronize modifications in source filesystem 500 into the standby filesystem. In an embodiment, before step 602, the synchronization phase makes a point-in-time readonly snapshot (i.e. copy) of the files in source filesystem 500. In an embodiment, source filesystem 500 is temporarily made readonly while the snapshot is being made within source filesystem 500.

In an embodiment, the synchronization phase includes step 602 that is repeated for each of files A-E and may be combined with previous step 601. In an extended attribute of a source clone file that is ignored by source filesystem 500, step 602 stores an identifier of a source base file. For example, file D is based on file C that is identified by inode 13. Thus, step 602 stores an identifier (e.g. LBA) of inode 3 in the extended attribute of file D. Step 602 leaves the extended attribute empty for files B and E that are root files of respective source trees.

In an embodiment, step 602 uses the point-in-time readonly snapshot of the source files in source filesystem 500 so that the original source files may remain in service and be modified without affecting a simultaneously ongoing synchronization.

Step 602 traverses the files of source trees 531-535 or, in an embodiment, the files of the snapshot, and populates metadata 510 based on clone relationships extracted from each source clone file's extended attribute provided by step 601. During the traversal, step 602 replicates the files without a clone relationship to the standby file system, such as files B and E, where file B is a standalone file without a clone and file E is a tree root.

After step 602 is exhaustively repeated, metadata 510 is fully persisted in a non-tabular format in source filesystem 500 within various index entries of various inodes of various directories in source filesystem 500. Between steps 602-603, computer(s) in the storage system may reboot, including forgetting all data stored in volatile memory. For example, rebooting may cause merge-find set 520 to be forgotten, in which case step 603 should regenerate merge-find set 520 from metadata persisted by step 602.

Step 603 populates merge-find set 520 to identify logical trees that are source trees of files that include: a) a tree root file that is not based on other files and b) clone files that are directly or indirectly based on the tree root file. For example by analyzing metadata 510, step 603 discovers source tree 531 that contains root file E and clone files such as files A and C that are arranged into tree levels 1-3. Step 603 coalesces multiple trees. For example as shown, step 603 merges subtrees 536-538 into tree 532.

Between steps 603-604, some shared and unshared data blocks of some of files A-E may be or, in an embodiment, not be modified in source filesystem 500. Step 604 synchronizes those modifications from source filesystem 500 to the standby filesystem.

In an embodiment, step 604 simultaneously synchronizes remaining files (i.e. non-root source clone files) in a particular level in a sequence of logical levels 2-3 of tree 531 of files in source filesystem 500 with the standby filesystem. For example, step 604 may detect that files A and C are both in level 2 of tree 531, in which case step 604 synchronizes files A and C by two respective concurrent execution contexts. In particular, the synchronization operation is not an exact replication of all data blocks of all source clone files to the standby filesystem. Instead the source filesystem only sends control information to the standby computer whose logic directs the standby filesystem to make a clone of file C and a clone of file A from the already replicated file E, and then make a clone of file D from the clone of file C.

After synchronization of data blocks by step 604, step 605 further detects the differed blocks introduced by modification on either the source files or the source clone files after the clone operation before step 602. Step 605 compares each source clone file with its base file (e.g., compare file C with file E), and detects which of their data blocks differ. Then, in an embodiment, a previously modified data block that was synchronized by step 604 is again modified and again needs synchronization. In an embodiment, step 605 sends these differed blocks of each source clone file to the standby computer, and logic of the standby computer replaces the old blocks of standby clone files (e.g., A, C and D) with the differed blocks. In an embodiment, step 605 performs the second modification of the same source data block by replacing the previously modified version of the source data block in previously modified file A or C-E with a further modified version of the previously modified version of the source data block.

For example in an embodiment, files A and C-E are in same source tree 531 and may share that same source data block that is again modified through any one of files A or C-E. Inspection of merge-find set 520 reveals that the modified data block is shared in all of levels 1-3 because file A and C-E span levels 1-3. Thus as explained earlier herein, the modified data block should be synchronized as part of file C in level 2 that is the highest level of levels 2-3 that share the data blocks with the root E at level 1, and it is also the base file of the source clone file of D. Thus: a) even though file C may be discovered last in metadata 510, file C is synchronized before file D, and b) sharing of the modified data block by replica files of source files C and D in the standby system is preserved despite repeated modification and synchronization of the data block and regardless which of files C and D was used for making the modification. Simultaneously, A is cloned from E, and it has no cloned file from itself, so its differed blocks from E can be replicated to the standby without any order dependency.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
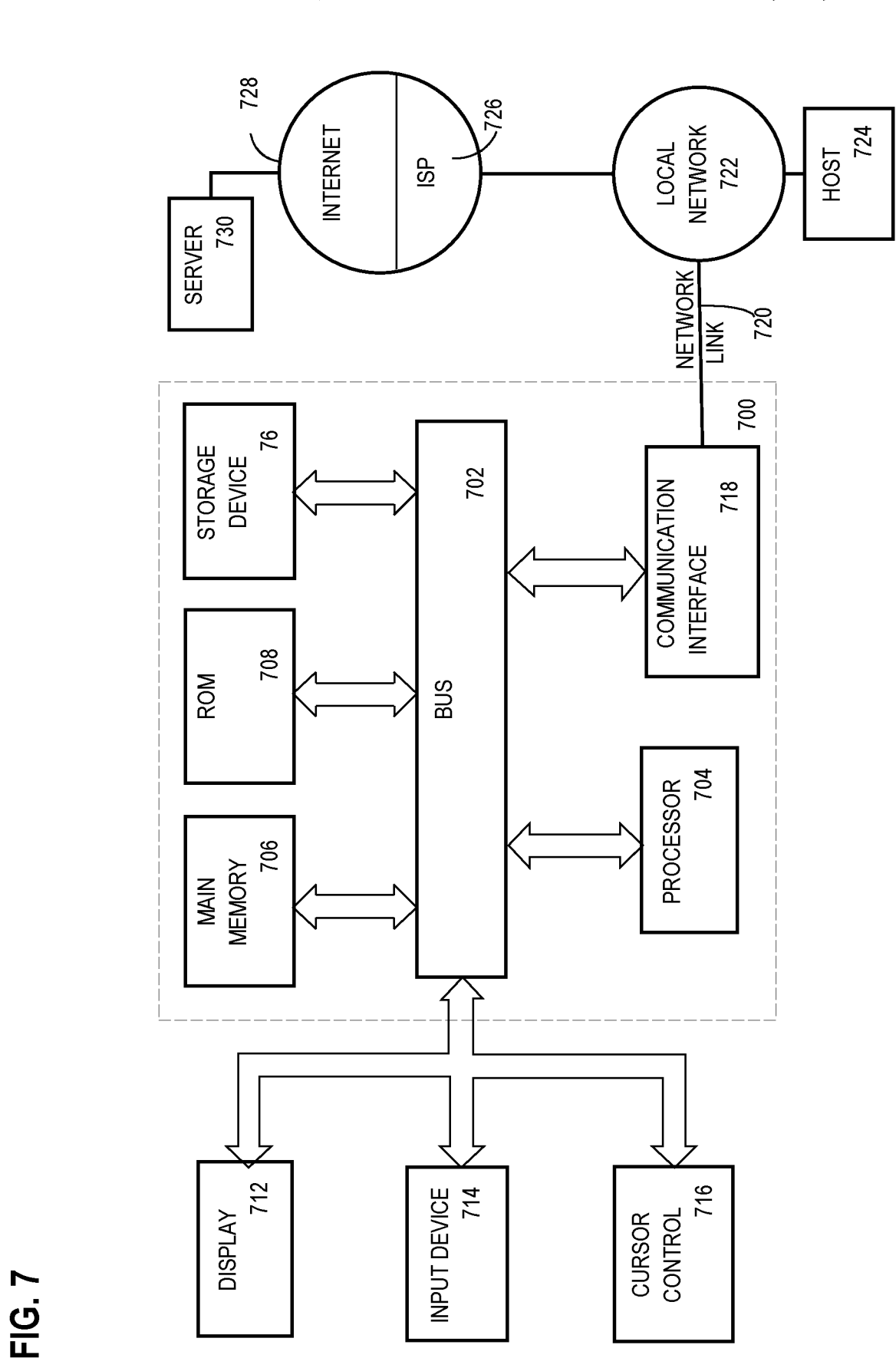
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 76, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 76. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 76. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 76 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 76, or other non-volatile storage for later execution.

Software Overview

Figure 8:
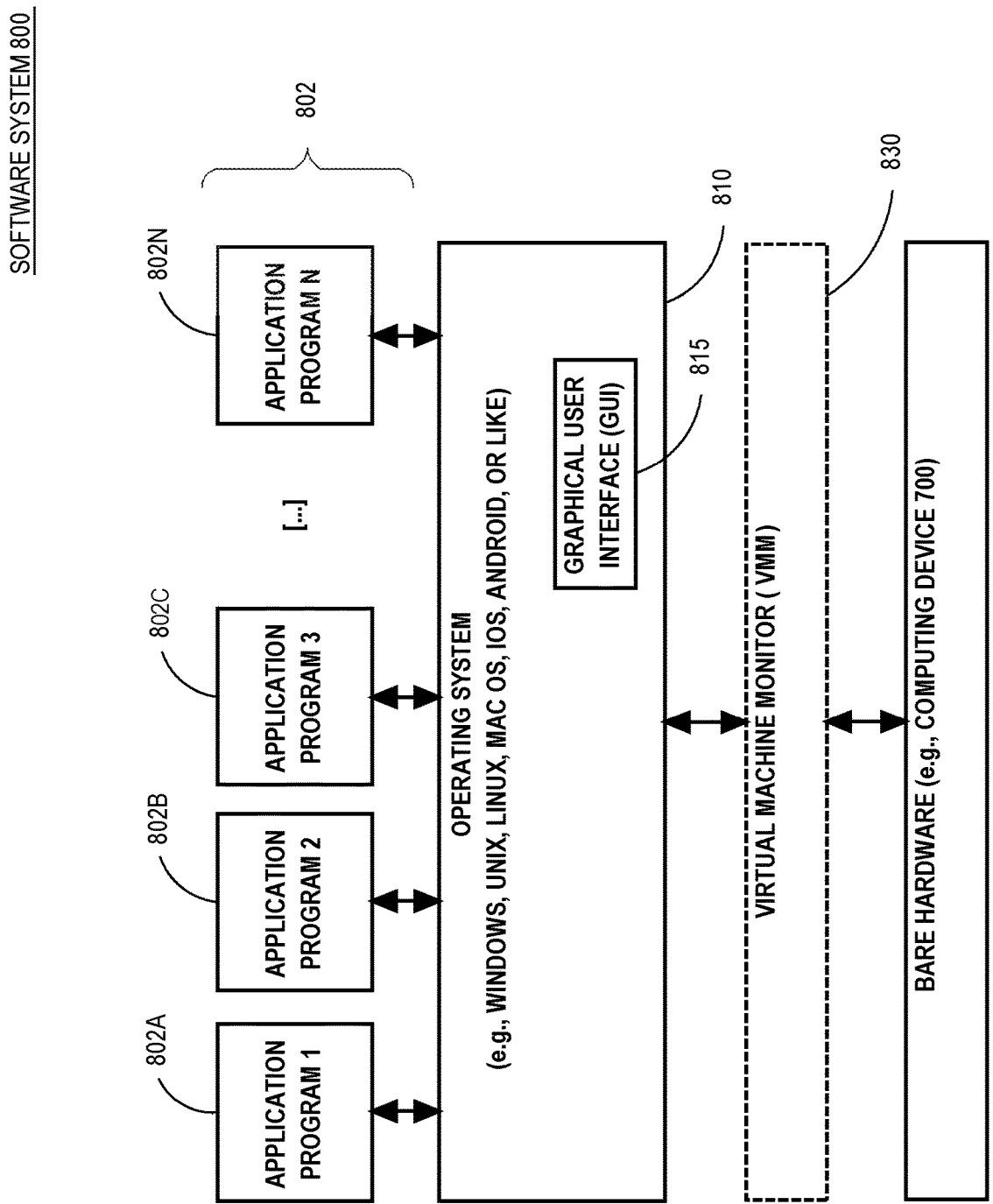
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 76, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 76 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a source data block in a source filesystem and a replica data block in a standby filesystem that is a copy of the source data block in the source filesystem;
   including, in each of a source file and a source clone file that is a copy of the source file, same said source data block in the source filesystem;
   including, in each of a replica file and a replica clone file that is a copy of the replica file, same said replica data block in the standby filesystem that is the copy of the source data block in the source filesystem;
   replacing, in the source file, the source data block with a modified copy of the source data block without modifying the source data block in the source clone file;
   replacing, in the replica file, the replica data block with the modified copy of the source data block without modifying the replica data block in the replica clone file.

2. The method of claim 1 further comprising:
   storing a second source data block in the source filesystem and a second replica data block in the standby filesystem that is a copy of the second source data block in the source filesystem;
   including, in each of the source file and the source clone file that is a copy of the source file, same said second source data block in the source filesystem;
   including, in each of the replica file and the replica clone file that is a copy of the replica file, same said second replica data block in the standby filesystem that is the copy of the second source data block in the source filesystem;

replacing, in the source clone file, the second source data block with a modified copy of the second source data block without modifying the second source data block in the source file;

replacing, in the replica clone file, the second replica data block with the modified copy of the second source data block without modifying the second replica data block in the replica file.

3. The method of claim 1 further comprising:

including, in a second source clone file that is a second copy of the source file, same said source data block in the source filesystem;

including, in a second replica clone file that is a second copy of the replica file, same said replica data block in the standby filesystem that is the copy of the source data block in the source filesystem;

storing a second source data block in the source filesystem and a second replica data block in the standby filesystem that is a copy of the second source data block in the source filesystem;

including, in each of the source clone file and a third source clone file that is a copy of the source clone file, same said second source data block in the source filesystem;

including, in each of the replica clone file and a third replica clone file that is a copy of the replica clone file, same said second replica data block in the standby filesystem that is the copy of the second source data block in the source filesystem;

detecting:
the second source clone file is based on the source file,
the third source clone file is based on the source file and the source clone file,
the second source clone file is based on a subset of files that the third source clone file is based on;

synchronizing, based on said detecting the second source clone file is based on the subset of files that the third source clone file is based on, the second source clone file with the second replica clone file before synchronizing the third source clone file with the third replica clone file.

4. The method of claim 1 further comprising:

replicating, in the standby filesystem, a plurality of files in the source filesystem;

identifying a plurality of logical trees of files, wherein each tree in the plurality of logical trees of files consists of:
a tree root file that is not based on other files, and
one or more clone files that are directly or indirectly based on the tree root file;

simultaneously synchronizing the plurality of logical trees of files in the source filesystem with the standby filesystem.

5. The method of claim 4 wherein:

each tree in the plurality of logical trees of files consists of a sequence of logical levels;

each level in the sequence of logical levels of each tree in the plurality of logical trees of files consists of files that are based on a same number of files;

the method further comprises simultaneously synchronizing the files in a particular level in the sequence of logical levels of a particular tree in the plurality of logical trees of files in the source filesystem with the standby filesystem.

6. The method of claim 4 wherein said identifying the plurality of logical trees of files comprises populating a merge-find set.

7. The method of claim 1 further comprising storing, in an extended attribute of the source clone file that is ignored by the source filesystem, an identifier of the source file.

8. The method of claim 7 wherein said storing the identifier of the source file comprises storing, in the extended attribute of the source clone file, an identifier of an inode of the source file.

9. The method of claim 1 further comprising after said replacing the source data block and before said replacing the replica data block, replacing the modified copy of the source data block in the source file with a further modified copy of the modified copy of the source data block.

10. One or more non-transitory computer-readable media storing instructions that, when executed by one or more processors, cause:

storing a source data block in a source filesystem and a replica data block in a standby filesystem that is a copy of the source data block in the source filesystem;

including, in each of a source file and a source clone file that is a copy of the source file, same said source data block in the source filesystem;

including, in each of a replica file and a replica clone file that is a copy of the replica file, same said replica data block in the standby filesystem that is the copy of the source data block in the source filesystem;

replacing, in the source file, the source data block with a modified copy of the source data block without modifying the source data block in the source clone file;

replacing, in the replica file, the replica data block with the modified copy of the source data block without modifying the replica data block in the replica clone file.

11. The one or more non-transitory computer-readable media of claim 10 wherein the instructions further cause:

storing a second source data block in the source filesystem and a second replica data block in the standby filesystem that is a copy of the second source data block in the source filesystem;

including, in each of the source file and the source clone file that is a copy of the source file, same said second source data block in the source filesystem;

including, in each of the replica file and the replica clone file that is a copy of the replica file, same said second replica data block in the standby filesystem that is the copy of the second source data block in the source filesystem;

replacing, in the source clone file, the second source data block with a modified copy of the second source data block without modifying the second source data block in the source file;

replacing, in the replica clone file, the second replica data block with the modified copy of the second source data block without modifying the second replica data block in the replica file.

12. The one or more non-transitory computer-readable media of claim 10 wherein the instructions further cause:

including, in a second source clone file that is a second copy of the source file, same said source data block in the source filesystem;

including, in a second replica clone file that is a second copy of the replica file, same said replica data block in the standby filesystem that is the copy of the source data block in the source filesystem;

storing a second source data block in the source filesystem and a second replica data block in the standby filesystem that is a copy of the second source data block in the source filesystem;

including, in each of the source clone file and a third source clone file that is a copy of the source clone file, same said second source data block in the source filesystem;

including, in each of the replica clone file and a third replica clone file that is a copy of the replica clone file, same said second replica data block in the standby filesystem that is the copy of the second source data block in the source filesystem;

detecting:
the second source clone file is based on the source file,
the third source clone file is based on the source file and the source clone file,
the second source clone file is based on a subset of files that the third source clone file is based on;

synchronizing, based on said detecting the second source clone file is based on the subset of files that the third source clone file is based on, the second source clone file with the second replica clone file before synchronizing the third source clone file with the third replica clone file.

13. The one or more non-transitory computer-readable media of claim 10 wherein the instructions further cause:
replicating, in the standby filesystem, a plurality of files in the source filesystem;
identifying a plurality of logical trees of files, wherein each tree in the plurality of logical trees of files consists of:
a tree root file that is not based on other files, and
one or more clone files that are directly or indirectly based on the tree root file;
simultaneously synchronizing the plurality of logical trees of files in the source filesystem with the standby filesystem.

14. The one or more non-transitory computer-readable media of claim 13 wherein:
each tree in the plurality of logical trees of files consists of a sequence of logical levels;
each level in the sequence of logical levels of each tree in the plurality of logical trees of files consists of files that are based on a same number of files;
the instructions further cause simultaneously synchronizing the files in a particular level in the sequence of logical levels of a particular tree in the plurality of logical trees of files in the source filesystem with the standby filesystem.

15. The one or more non-transitory computer-readable media of claim 13 wherein said identifying the plurality of logical trees of files comprises populating a merge-find set.

16. The one or more non-transitory computer-readable media of claim 10 wherein the instructions further cause storing, in an extended attribute of the source clone file that is ignored by the source filesystem, an identifier of the source file.

17. The one or more non-transitory computer-readable media of claim 16 wherein said storing the identifier of the source file comprises storing, in the extended attribute of the source clone file, an identifier of an inode of the source file.

18. The one or more non-transitory computer-readable media of claim 10 wherein the instructions further cause after said replacing the source data block and before said replacing the replica data block, replacing the modified copy of the source data block in the source file with a further modified copy of the modified copy of the source data block.

19. One or more computers configured to:
store a source data block in a source filesystem and a replica data block in a standby filesystem that is a copy of the source data block in the source filesystem;
include, in each of a source file and a source clone file that is a copy of the source file, same said source data block in the source filesystem;
include, in each of a replica file and a replica clone file that is a copy of the replica file, same said replica data block in the standby filesystem that is the copy of the source data block in the source filesystem;
replace, in the source file, the source data block with a modified copy of the source data block without modifying the source data block in the source clone file;
replace, in the replica file, the replica data block with the modified copy of the source data block without modifying the replica data block in the replica clone file.

20. The one or more computers of claim 19 further configured to:
include, in a second source clone file that is a second copy of the source file, same said source data block in the source filesystem;
include, in a second replica clone file that is a second copy of the replica file, same said replica data block in the standby filesystem that is the copy of the source data block in the source filesystem;
store a second source data block in the source filesystem and a second replica data block in the standby filesystem that is a copy of the second source data block in the source filesystem;
include, in each of the source clone file and a third source clone file that is a copy of the source clone file, same said second source data block in the source filesystem;
include, in each of the replica clone file and a third replica clone file that is a copy of the replica clone file, same said second replica data block in the standby filesystem that is the copy of the second source data block in the source filesystem;
detect:
the second source clone file is based on the source file,
the third source clone file is based on the source file and the source clone file,
the second source clone file is based on a subset of files that the third source clone file is based on;
synchronize, based on said detecting the second source clone file is based on the subset of files that the third source clone file is based on, the second source clone file with the second replica clone file before synchronizing the third source clone file with the third replica clone file.

* * * * *